United States Patent [19]
Soukal

[11] Patent Number: 5,349,585
[45] Date of Patent: Sep. 20, 1994

[54] METHOD FOR TRANSMITTING TWO DIGITAL SIGNALS WHICH ARE INDEPENDENT OF ONE ANOTHER

[75] Inventor: Peter Soukal, Schwarzenbruck, Fed. Rep. of Germany

[73] Assignee: Siemens Aktiengesellschaft, Munich, Fed. Rep. of Germany

[21] Appl. No.: 87,881

[22] Filed: Jul. 9, 1993

[30] Foreign Application Priority Data

Jul. 17, 1992 [DE] Fed. Rep. of Germany ....... 4223639

[51] Int. Cl.$^5$ ............................................. H04J 13/00
[52] U.S. Cl. ............................................... 370/110.4
[58] Field of Search ................... 370/110.4, 111, 112, 370/105.3, 100.1; 375/17, 20

[56] References Cited

U.S. PATENT DOCUMENTS

| | | | |
|---|---|---|---|
| 4,387,460 | 6/1983 | Boutmy et al. | 370/110.4 |
| 4,408,325 | 10/1983 | Grover | 375/20 |
| 4,706,245 | 11/1987 | Suzuki et al. | 370/110.4 |
| 4,952,070 | 8/1990 | Leedke et al. | 370/110.4 |

FOREIGN PATENT DOCUMENTS 617854  8/1989 Australia .
3830120A1 3/1990 Fed. Rep. of Germany .

Primary Examiner—Douglas W. Olms
Assistant Examiner—Min Jung
Attorney, Agent, or Firm—Hill, Steadman & Simpson

[57] ABSTRACT

A method for transmitting two digital signals includes utilizing an encoder to generate a pulse of a fixed width in a coded signal each time a positive going 0-1 transmission is detected in the pulse channel. The polarity of the pulse generated by the encoder is defined by a signal present at the signal channel input. The two digital signals are separated after transmission by a decoder which utilizes the time between two successive level changes. A signal edge in the coded signal initiates a time measurement by the decoder and when a further signal edge appears within a fixed time limit then a signal is allocated to the pulse channel. When, instead, no further signal edge appears within this time limit, the signal is allocated to the signal channel of the decoder.

3 Claims, 2 Drawing Sheets

5,349,585

METHOD FOR TRANSMITTING TWO DIGITAL SIGNALS WHICH ARE INDEPENDENT OF ONE ANOTHER

BACKGROUND OF THE INVENTION

1. Field of the Invention

The present invention relates generally to a method for transmitting via a common channel two digital signals that are independent of one another.

2. Description of the Related Art

Time division multiplex (TDM) methods and frequency division multiplex (FDM) methods for transmitting two digital signals via one channel are known.

SUMMARY OF THE INVENTION

An object of the present invention is to provide a method for transmitting two digital signals on a single channel in which the signal mixing and, in turn, the separation of the two digital signals is handled exclusively by encoding and decoding.

This and other objects and advantages of the invention are provided by a method for transmitting two digital signals which are independent of one another via a common channel, whereby one signal is supplied to a pulse channel and the other signal is supplied to a signal channel of an encoder. At every 0-1 transition of the pulse channel signal a pulse of a fixed width is generated at the coded signal output. The polarity of the pulse is defined by the signal at the signal channel. After transmission of the coded signal, a decoder utilizes the time between two successive level changes for separating the coded signal into the first and second signals, in that a signal edge of the coded signal starts a time measurement by the decoder. The signal is allocated to the pulse channel when a further signal edge appears within a time fixed limit, or is allocated to the signal channel when no further signal edge has appeared within this fixed limit time.

In comparison to known digital signal transmission methods, the invention of the present invention has the following difference:

The method of the present invention requires no fixed time grid for signal coding, as would be required in time division multiplex transmission. A carrier frequency is not modulated with the signals in the present method, compared to frequency division multiplex methods which would require that a carrier frequency be transmitted and demodulated. According to the present method, there is no need that a clock signal also be transmitted with the signal, which would otherwise have to be recovered by the receiving system in order to undertake decoding of the transmitted signal.

The method of the present invention may be referred to as a signal-pulse-coding (SPC) transmission method. The SPC transmission method is suitable for transmitting two digital signals, for example, within an x-ray installation, wherein the two sub-components of the x-ray generator signals, the control part and the power part, are transmitted.

The transmission medium utilized for transmitting the signal pulse coded signal between the encoder and the decoder may be any of a variety of transmitting mediums. The present method is particularly well suited for light waveguide (LWL) transmission, since the present transmission method tolerates pronounced signal distortions, such as distortions in pulse width, without error. Typically, light waveguides produce high pulse width distortions. The time limit of the decoder is then set to accommodate the pulse width distortions.

BRIEF DESCRIPTION OF THE DRAWINGS

The present invention shall be set forth in greater detail hereinbelow with reference to an exemplary embodiment shown in the drawings.

DETAILED DESCRIPTION OF THE PREFERRED EMBODIMENTS

Figure 1:
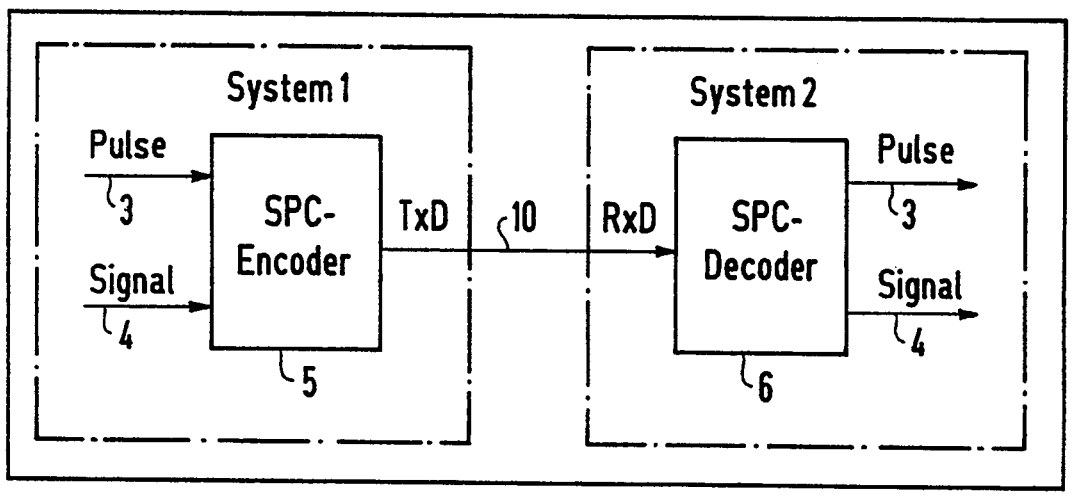
FIG. 1 a schematic block diagram illustrating the method according to the present invention.

A signal-pulse-coding (SPC) transmission method enables two digital signals which are independent of one another to be combined to form a single signal which is transmitted along a channel and then is separated into the two signals. With reference to FIG. 1, the two signals on two channels, a pulse channel 3 and a signal channel 4, are supplied to an SPC encoder 5 in a transmitting system 1 for carrying out the present method. The SPC encoder 5 combines the two signals to form a coded transmission signal T×D according to a defined rule. The coded signal T×D is transmitted, for example, via a light waveguide. After transmission, the coded signal is a received signal R×D at an input of a receiving system 2 and is supplied to the input of the SPC decoder 6. The SPC decoder 6 reconstructs the individual signals on a pulse channel 3' and a signal channel 4' from the coded received signal R×D.

The signal channel 4 can be used for transmission of any arbitrary digital signal. However, the pulse channel 3 may only be used for transmission of pulses. Typical uses for the pulse channel 3 are for transmitting counting signals. Counting signals do not contain information in the signal form but instead the information is contained in the number of pulses per time. This is the difference between the two channels 3 and 4. The signal channel 4 transmits a signal form, while the pulse channel 3 transmits only the correct number of pulses and not the signal form itself.

As in every transmission method, careful attention to the band width of the transmission and to the timing of the signal must be maintained, as will be discussed hereinafter. The present method is implemented with programmable digital logic modules in the present example. One such programmable digital logic module is used as the SPC encoder and a further digital logic module is used as the SPC decoder.

The primary goals for the two channels 3 and 4 in the present transmission method are, a) that the pulse channel 3 must correctly transmit the number of pulses of the pulse channel, and b) the signal channel 4 must correctly transmit the form of the signal on the signal channel.

Figure 2:
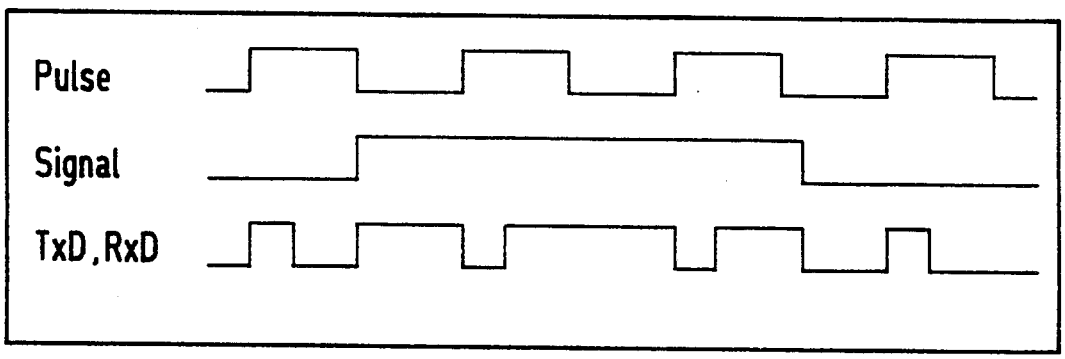
FIG. 2 is a signal diagram showing the signals present in the system of FIG. 1.

Referring now to FIG. 2, the operation of the SPC method is illustrated most clearly with reference to time diagrams of a coded signal and the constituent parts thereof. The operation of the present method explained in conjunction with FIG. 2 is as follows:

At every 0–1 (positive going) transition of a signal at the input of the pulse channel 3, a transmission pulse is generated having a fixed time, or width, in the coded signal T×D at the output. A transmission pulse generated by the encoder is distinguished from a pulse received at the pulse channel input 3. The transmission pulse is of fixed duration, or width. The signal at the signal channel 4 defines the polarity of the pulse at the coded signal output wherein the pulses are positive when the signal channel signal is 0 and the pulses are negative when the signal channel is 1, as can be seen in FIG. 2. The coded signal T×D includes the informational content in, first, the presence of either a signal level 0 or signal level 1 and, second, in the pulse width. Broadly stated, this coded signal T×D corresponds to the signal from the signal channel 4 permeated with pulses. Of course, the pulse channel can be set to transmit a pulse at each 1–0, negative going, transition of the pulse channel signal instead.

To separate the two signals, the pulse width is utilized by the decoder 6 to separate the received signal R×D into the two channels 3' and 4'. The time of two successive level changes, or signal edges, are used for separating the channels. One signal edge in the coded signal initiates a time measurement. When a further signal edge appears within a fixed time limit, it is determined that a pulse has been transmitted from the pulse channel 3. A pulse is output on the pulse output channel 3'. When no further signal edge is found within the time limit, then it is determined that the momentary level of the coded signal corresponds to the level of the signal channel 4 and the signal output channel 4' is set to the level of the coded signal.

The SPC encoder 5, as shown in FIG. 1, generates the coded output signal T×D by encoding the inputs of the pulse channel 3 and the signal channel 4. During the coding process, the following tasks must be monitored: The signal editing of the pulse channel 3, the synchronization of the two channels 3 and 4, and the linking of the two channels 3 and 4.

Figure 3:
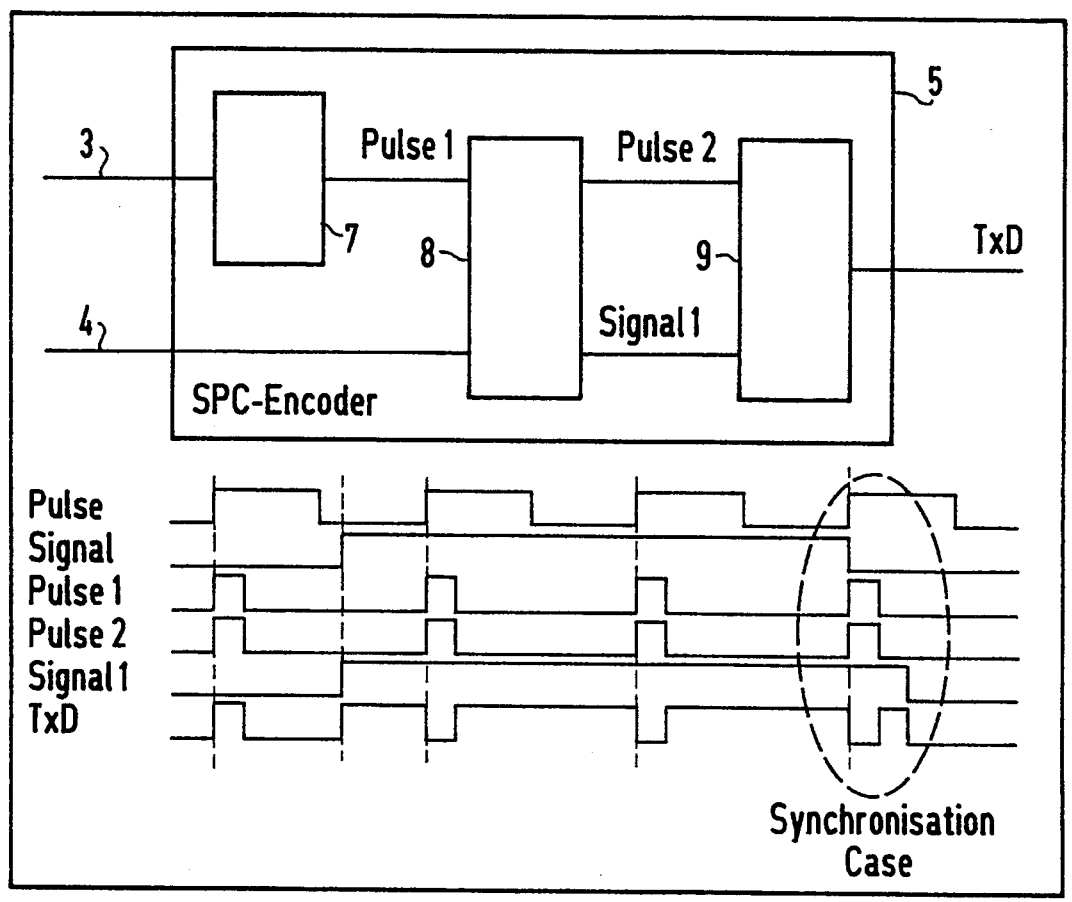
FIG. 3 is a functional block diagram of an encoder as shown in FIG. 1 including signals appearing at various locations in the encoder shown therebelow.

In FIG. 3 is shown a block circuit diagram of a preferred embodiment of an encoder 5 that addresses the above-listed tasks. Also shown is an appertaining time diagram for signals in the encoder 5. This diagram shall be explained with reference to the tasks performed by the block elements of the encoder.

An signal editing unit 7 is utilized for generating transmission pulses having a fixed pulse width at every positive going (0–1) edge in the signal present at the pulse channel 3. A synchronization unit 8 is provided having two inputs and two outputs. The synchronization unit 8 insures that the potential chronological overlaps, i.e. simultaneous signal level changes and signal level changes occurring within a fixed time limit of the transmission pulses, of the two channels 3 and 4 are brought into harmony. For instance, in the circled portion of the time signal diagram is illustrated a chronological overlap in the pulse and signal channels 3 and 4. The diagram shows that the synchronization unit 8 prioritizes the pulse channel 3 and implements a time-delay in transmitting the level change in the signal channel 4. Any level change in the signal channel within a set transmission pulse time after a pulse is delayed in a pulse priority system.

The present method need not be implemented in this way, however, since a prioritization of the signal channel 4 is also possible. In other words, a level change in the signal channel is transmitted and the pulse is delayed until after the fixed delay time.

A linking unit 9 undertakes signal shaping as well as chronological matching of the two channels 3 and 4. In a preferred embodiment, the linking 9 is composed only of an exclusive OR logic gate EXOR having its basic digital function. The coded signal is then ready for transmission.

The SPC decoder 6 is utilized to reconstruct the two channels, the pulse channel 3' and the signal channel 4', at the receiving end from the coded signal R×D. As already mentioned, a necessary feature of the SPC decoder 6 is the capability to recognize whether two successive signal edges in the received signal R×D exceed a chronological minimum difference or not. In other words, it must recognized whether a threshold of a transmission pulse width is exceeded or not.

The decoding of the two signals may be explained verbally by the following rules:

1. When two successive signal edges are recognized in the coded signal and the chronological difference is less than limit time $t_{limit}$, then a pulse is generated at the decoded pulse channel output 3' by the decoder.

2. When the two successive signal edges in the coded signal have a chronological difference of greater than the limit time $t_{limit}$, the momentary level of the received coded signal R×D indicates the level to be provided at the signal channel output 4' of the decoder.

Figure 4:
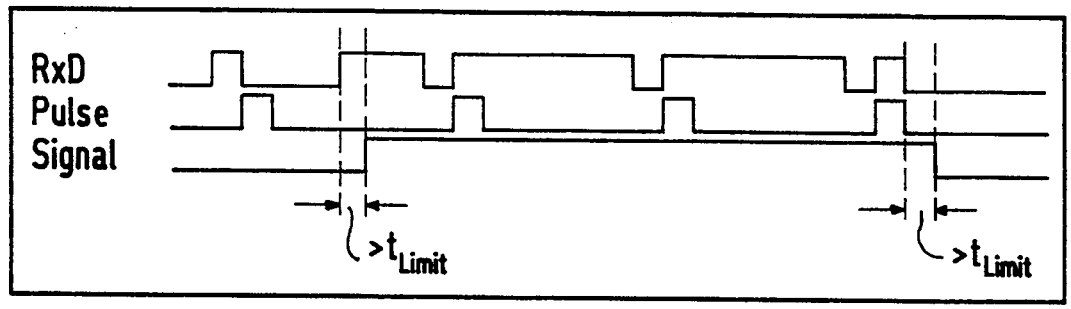
FIG. 4 is a signal diagram of signals for explaining the function of the decoder shown in FIG. 1.

As shown in FIG. 4, a time diagram of the signals illustrates the decoding process. The decoded signal of the pulse channel 3 are always delayed by at least the transmission pulse width in the received coded signal R×D. This is due to the fact that the transmission of a pulse can only be recognized after the arrival of a second signal edge within the limit time $t_{limit}$. Of course, the time limit $t_{limit}$ is set to exceed the transmission pulse width.

There is likewise a minimum delay time of $t_{limit}$ in the decoding of the signal channel 4, since at least the limit time $t_{limit}$ must elapse following a signal edge in the received coded signal R×D before a new level can be output at the signal channel output 4'.

To apply a transmission method, the method must be viewed in total in both a qualitatively and quantitatively manner. In other words, the fundamental behavior must be understood and characteristic values must be present with which a dimensioning of the components is possible. Thus, a transmission channel 10, as shown in FIG. 1, which accommodates the transmission characteristics of the present method must also be selected for the transmission process, and in addition to the SPC encoder 5 and the SPC decoder 6 characteristics must be selected as well.

As already mentioned, the most important behavior in the transmission method according to the present invention is that only pulses are transmitted in the pulse channel 3 signals, while the signal shape is preserved in the signal channel 4 signals.

As in every transmission method, the present signal pulse coding transmission method has certain undesirable side effects that one must be aware of. These are:

A delay time: $t_{delay}$ in the receipt of the coded signal R×D, and at a chronological uncertainty, or jitter, $t_{jitter}$.

The delay time $T_{delay}$ includes the processing times of the encoder 5 and the decoder 6 and the signal transmission time of the transmission channel 10.

The chronological uncertainty describes the range of the tolerance of the delay time. The chronological uncertainty is a measure for the range within which the delay time can fluctuate. The cause of such uncertainty lies in, on the one hand, the operation of the encoder 5 and the decoder 6 with asynchronous, freewheeling clocks. On the other hand, the uncertainty also lies in that one channel is coded and transmitted with a delay when there are simultaneously or nearby simultaneously occurring events in both channels 3 and 4 in the SPC encoder 5.

Another, extremely important characteristic value for all transmission methods is the band width required. In general, the transmission channel 10 has a fixed, finite band width. The two signal channels 3 and 4 also have a fixed band width. The frequency range of both channels 3 and 4 extend from 0 up to the corresponding, maximum band width.

The utilization of the band width of the transmission channel is not 100%. In other words, the sum of the band widths of the pulse channel 3 and the signal channel 4 is less than the band width of the transmission channel 10. The band width utilization and the present SPC transmission method lies at a maximum of about 90%.

To fix the transmission behavior in characteristic values, the SPC encoder 5 and the SPC decoder 6 must be discussed, since these determine all characteristic values. The following characteristic values are important for the application of the present method:

$B_K$ band width of the transmission channel 10
$B_P$ band width of the pulse channel 3
$B_S$ band width of the signal channel 4
$t_{Delay\ P}$ delay time of the pulse channel 3
$t_{Delay\ S}$ delay time of the signal channel 4
$t_{Jitter\ P}$ uncertainty of the pulse channel 3
$t_{Jitter\ S}$ uncertainty of the signal channel 4

The above-listed factors for the elements used in a system for carrying out the present method should be evaluated when selecting the parts of the system.

The present method may be realized within an x-ray generator in order to transmit two signals from one subcomponent to another.

Thus, there is shown and described a method for mixing two digital signals and then for separating them based exclusively encoding and decoding.

Although other modifications and changes may be suggested by those skilled in the art, it is the intention of the inventor to embody within the patent warranted hereon all changes and modifications as reasonably and properly come within the scope of his contribution to the art.

I claim:

1. A method for transmitting two digital signals that are independent of one another via a common channel, comprising the steps of:

transmitting a first and second signal including:

supplying said first signal to a pulse channel of an encoder;

supplying said second signal to a signal channel of the encoder;

generating a pulse of fixed width in a coded signal at an output of the encoder for transmission upon every level transition of said first signal;

defining a polarity of said pulse in said coded signal for transmission by said second signal;

receiving said first and second signals including:

separating said coded signal into said first and second signals by using time measurements between two successive level changes in said coded signal;

starting a time measurement at one signal edge of said coded signal;

allocating said coded signal to a pulse channel of a decoder when a further signal edge appears in said coded signal within a fixed time limit; and allocating said coded signal to a signal channel of the decoder when no further signal edge appears in said coded signal within said fixed time limit.

2. A method as claimed in claim 1, further comprising the step of:

transmitting said coded signal via a light waveguide.

3. A method as claimed in claim 1, further comprising the steps of:

transmitting said coded signal from one sub-component to another sub-component of an x-ray generator.

* * * * *